United States Patent Office 3,510,528
Patented May 5, 1970

3,510,528
PROCESS FOR PREPARING META-ALKYL-
CHLORO- AND FLUOROPHENOLS
Lawrence E. Stevick and Gustave K. Kohn, Berkeley,
Calif., assignors to Chevron Research Company, San
Francisco, Calif., a corporation of Delaware
No Drawing. Filed Apr. 20, 1967, Ser. No. 632,208
Int. Cl. C07c 39/36, 39/24, 39/27
U.S. Cl. 260—623                              10 Claims

ABSTRACT OF THE DISCLOSURE

Process for preparing m-alkylchloro- and fluorophenols which comprises reacting amonoalkene of 3 to about 15 carbon atoms with chlorophenol or fluorophenol in the presence of an acid-activated Group II metal montmorillonite clay at about 110 to 155° C. and thereafter increasing the temperature to about 165 to 190° C.

INVENTION BACKGROUND

This invention is directed to methods for preparing m-alkylchlorophenol and m-alkylfluorophenol.

Meta-alkylhalophenols are difficult to make by presently known methods. The available methods involve tedious procedures in order to keep the halogen from being removed from or migrating on the benzene nucleus.

Although a method has been developed for preparing m-alkylphenol by reacting alkenes with phenol using clay-acid catalysts, extending this method to halophenol would not appear technically promising. Firstly, it is likely that the halogen would migrate or be removed from the benzene nucleus under the process conditions. Secondly, the halogen deactivates the benzene nucleus due to its inductive effect. Thus, one would expect to use more stringent reaction conditions, e.g., higher temperature, with halophenol. Higher temperatures would, of course, increase the chance of removing the halogen from the nucleus. In fact, such difficulties were experienced in attempting to prepare m-butylbromophenol. The reaction gave an extremely complex product, bromine dissociated from the benzene nucleus and only a small amount of m-butylbromophenol was formed.

INVENTION DESCRIPTION

Surprisingly, it has now been found that the fluoro and chloro species of halophenol may be reacted with monoalkenes to make m-alkylfluoro- and m-alkylchlorophenol. As contrasted to the bromophenol reaction, the reactions with fluorophenol and chlorophenol proceed without significant halogen dissociation from the benzene nucleus. In accordance with this discovery, m-alkylfluoro- and m-alkylchlorophenol may be prepared by reacting a hydrocarbon monoalkene of 3 to about 15 carbon atoms with chloro or fluorophenol in the presence of an acid-activated Group II metal montmorillonite clay at a temperature and for a time sufficient to alkylate the halophenol in the ortho and/or para position relative to the hydroxyl group and thereafter increasing the temperature in order to isomerize the otho and/or para-alkylhalophenol to its corresponding m-alkylhalophenol. This method is specific to fluoro and chlorophenols. The chlorine or fluorine may be in the ortho, para or meta position.

As described above, this process comprises an alkylation followed by an isomerization. The acid-activated clay is a catalyst in both of these steps. Consequently, the steps may be carried out consecutively without changing the reaction apparatus. The alkylation may be carried out at about 110 to about 155° C. The product of this alkylation comprises monoalkylmonohalophenol in which the halogen is fluorine or chlorine, the alkyl group is in the ortho or para position and the halogen is in the ortho, meta or para position. After the alkylation, the temperature is raised to about 165 to 190° C. preferably 180-190° C. for the isomerization. The isomerization normally approaches equilibrium within about 4 hours. The isomerization time will normally be in the range of 1 to 4 hours.

The monoalkenes to which this invention applies are exemplified by 1-propene, 1-butene, 2-butene, 1-pentene, 1-hexene, 1-octene, 1-decene, 1-dodecene, 1-tridecene and 1-pentadecene. Of these, the normal monoalkenes, i.e., mono-1-alkenes, containing 3 to about 6 carbon atoms are preferred. 1-butene is particularly preferred. Mol ratios of monoalkene to halopenol in the range of about 1:1.5 to 1:3 will be used in the process. Preferably, this mol ratio will be about 1:2.

The Group II metal montmorillonite clays which are used in this invention comprise $SiO_2$, $Al_2O_3$, $Fe_2O_3$, FeO, MnO, ZnO, MgO, CaO, $K_2O$, $Na_2O$, $Li_2O$, $TiO_2$ and traces of other compounds. Desirably, alkaline earth metal montmorillonites, preferably calcium montmorillonites having a low iron content, i.e., less than about 1.5 wt. percent on a dry basis calculated as $Fe_2O_3$, will be used. Group II metal ions such as Ca, Ba, Sr, Zn, Cd and Mg occupy most of the base exchange positions in these clays. A small number of the base exchange positions may be occupied by other metal cations such as alkali metal cations, iron and other transition metal ions. Examples of naturally occurring clays meeting the above specifications are those known commercially as Bentolite L, Gelwhite L and Clarolite T-60. The clay will be used in weight ratios of clay to hydrocarbon mono-alkene in the range of about 1:10 to 1:2.

The clay may be acid activated in situ or before adding it to the reaction mixture. When activated in situ, the raw clay is first dried until it contains approximately 5 to 8 wt. percent water. Care should be taken against overdrying the clay since overdrying may partially deactivate the clay. Sufficient drying is normally accomplished at about 100 to 120° C. for approximately 2 to 3 hours. After the clay is dried, it is put into the reaction mixture together with from about 0.02 to 0.1 g. acid per g. of clay. Mineral acids such as sulfuric and phosphoric acid are preferred. However, certain organic acids such as toluene sulfonic acid are acceptable.

When activated beforehand, the clay is contacted with an anhydrous acid solution such as sulfuric acid in ether. This slurry of clay, acid and anhydrous solvent may be filtered and washed repeatedly with solvent to remove excess acid. After a brief drying the clay is an excellent catalyst without the addition of more acid.

In the normal practice of the invention, the acid-activated clay will be added to the halophenol. The monoalkene will then be added gradually to the clay-halophenol mixture, keeping the halophenol in excess. After the alkylation and isomerization, the clay may be filtered off and the filtrate distilled to separate the alkylhalophenols from the excess halophenol.

EXAMPLES

The following examples illustrate the process of this invention and the specificity with respect to the halophenol reactant. These examples are offered to illustrate the invention and are in nowise intended to limit it.

Example 1

128.6 g. 2-chlorophenol, 34.5 g. of dried Bentolite L (a calcium montmorillonite clay) and 2.1 g. of concentrated sulfuric acid were mixed in a vessel. This mixture was stirred at 140 to 150° C. while 28.1 g. of 1-butene was added over several minutes. After this time, the temperature was increased to 185–190° C. and stirring was continued for an additional 3 hours. After this period, the clay was filtered from the reaction mixture and the filtrate was analyzed by gas liquid chromatography. This analysis showed that the 5-sec.-butyl-2-chlorophenol content of the mixed butylchlorophenols was 50 to 55% by weight.

Example 2

64.3 g. of 4-chlorophenol, 9.2 g. of dried Bentolite L and 0.55 g. of concentrated sulfuric acid were mixed in a flask. The mixture was heated to 130–135° C. and 14.0 g. of 1-butene were added to the mixture over several minutes. After this addition, the temperature was increased to 185–190° C. and the mixture was stirred at this temperature for an additional 2 hours. After this period the clay was filtered from the reaction mixture and the reaction mixture was analyzed by gas liquid chromatography. This analysis showed the 3-butyl-4-chlorophenol content of the mixed butyl chlorophenols to be 50% by weight.

Example 3

9.0 g. of 2-fluorophenol, 0.8 g. of dried Bentolite L and 1 drop of concentrated sulfuric acid were mixed in a vessel. This mixture was heated to 140–145° C. and 3.3. g. of 1-butene were added to the mixture over several minutes. After adding the 1-butene, the temperature of the combined mixture was increased to 180–185° C. and the combined mixture was stirred at this temperature for 6 hours. At the end of this time, another 0.8 g. of Bentolite L and another drop of concentrated sulfuric acid were added and this mixture was stirred for 4 hours at 180–185° C. At the end of the 4 hours the clay was filtered from the reaction mixture and the mixture was analyzed by gas liquid chromatography. This analysis showed the 5-sec.-butyl-2-fluorophenol content of the mixed butylfluorophenol to be 50% by weight.

Example 4

128.6 g. of 2-chlorophenol, 7.5 g. of dried Retrol (an essentially calcium montmorillonite) and 0.5 g. of concentrated sulfuric acid were mixed in a vessel. This mixture was stirred at 140–150° C. while 28.1 g. 1-butene were added to it over 20–30 minutes. At the end of this period, the temperature was increased to 180–185° C. and stirring was continued at this temperature for 4 hours. The clay was then filtered from the reaction mixture and the filtrate was analyzed by gas liquid chromatography. This analysis showed the 5-sec.-butyl-2-chlorophenol content of the mixed butylchlorophenols to be 36% by weight.

Example 5

By the general method decsribed in Example 1, 3-chlorophenol was alkylated with 1-butene and the alkylate was isomerized. After 26 hrs. heating at an isomerization temperature of 180–185° C. gas liquid chromatographic analysis showed the 5-sec.-butyl-3-chlorophenol content of the mixed butylchlorophenols to be 44% by weight.

Example 6

By the general method described in Example 1, 2-chlorophenol was alkylated with propene and the alkylate was isomerized for 4 hours at 180–185° C. After that time, chromatographic analysis showed the 5-propyl-2-chlorophenol content of the mixed propylchlorophenols to be 50% by weight.

Example 7

By the general method described in Example 1, 2-chlorophenol was alkylated with 2-pentene and the alkylate was isomerized for 4 hours at 180–185° C. After that time, chromatographic analysis indicated the 5-amyl-2-chlorophenol content of the mixed amylchlorophenols to be 38% by weight.

Example 8

By the general method described in Example 1, 2-chlorophenol was alkylated with 1dodecene and isomerized at 180–185° C. for 4 hours. After that time, chromatographic analysis indicated the 5-dodecyl-2-chlorophenol content of the mixed dodecylchlorophenols to be about 25% by weight.

Example 9

By the general method described in Example 1, 2-chlorophenol was alkylated with isobutene and the alkylate was isomerized at 180–185° C. for 4 hours. After that time chromatographic analysis indicated the 5-tert.-butyl-2-chlorophenol content of the mixed butylchlorophenols to be 52% by weight.

Example 10

By the general method described in Example 3, 4-fluorophenol was alkylated with 1-butene and the alkylate was isomerized at 180–185° C. for 4 hours. After that time, chromatographic analysis indicated the 5-sec.-butyl-4-fluorophenol content of the mixed butylfluorophenols to be 66.5% by weight.

Example 11

27.0 g. of 2-bromophenol, 2.0 g. of dried Bentolite L and 0.1 g. concentrated sulfuric acid were mixed in a vessel. This mixture was stirred at 135–145° C. and 5.6 g. of 1-butene was added to it in several minutes. The temperature of the combined mixture was then raised to 185–190° C. HBr was evolved. This temperature was held for 4 hours with stirring. Gas liquid chromatography indicated a complex mixture containing only a small amount of 2-bromo-5-sec.butylphenol was formed. Also, the catalyst appeared to be poisoned.

UTILITY

The m-alkylhalophenols of this invention may be used as intermediates to make biologically active materials. For instance they can be methylcarbamoylated by reaction with methylisocyanate to give insecticidal carbamates.

As will be evident to those skilled in the art, various modifications on this invention can be made or followed, in the light of the foregoing disclosure and discussion, without departing from the spirit or scope of the disclosure or from the scope of the following claims.

We claim:

1. Method for preparing m-alkyl monohalophenol which comprises reacting hydrocarbon mono-1-alkene of 3 to about 15 carbon atoms with monohalophenol wherein said halogen is fluorine or chlorine, in the presence of an acid-activated Group II metal montmorillonite clay at a temperature in the range of about 110 to about 155° C. for a time sufficient to alkylate the monohalophenol in at least one position selected from ortho and para relative to the hydroxyl group and thereafter increasing the temperature to about 165 to 195° C. for a time sufficient to isomerize said alkylate.

2. Method of claim 1 in which said monoalkene has 3 to about 6 carbon atoms.

3. Method of claim 1 in which said mono-1-alkene is 1-butene, isobutene, 2-pentene, propene or 1-dodecene and said mono halophenol is 2-chlorophenol, 4-chlorophenol, 3-chlorophenol, 2-fluorophenol or 4-fluorophenol.

4. Method of claim 1 in which the weight ratio of said clay to said monoalkene is in the range of about 1:10 to 1:2.

5. Method of claim 4 wherein the mol ratio of mono halophenol to monoalkene is about 1.5:1 to 3:1.

6. Method of claim 1 wherein the temperature is increased after alkylation to about 180–190° C.

7. Method of claim 6 wherein the temperature is increased for about 1 to 4 hours.

8. Method for isomerizing monoalkylmonohalophenol in which the halogen is fluorine or chlorine, the alkyl group contains 3 to about 15 carbon atoms and is in the ortho or para position to its corresponding monoalkylmonohalophenol in which the alkyl group is in the meta position which comprises heating said monoalkylmonohalophenol in which the alkyl is in the ortho or para position in the presence of an acid-activated Group II metal montmorillonite clay at about 165–195° C. for a time sufficient to isomerize said monoalkylmonohalophenol in which the alkyl is in the ortho or para position.

9. Method of claim 8 in which said alkyl has 3 to 6 carbon atoms.

10. Method of claim 8 in which said alkyl has 4 carbon atoms and the halogen is chlorine in the ortho position.

References Cited
UNITED STATES PATENTS

| | | |
|---|---|---|
| 2,115,884 | 5/1938 | Schollkopf. |
| 2,655,547 | 10/1953 | Bryner _____ 260—623 |
| 2,784,239 | 5/1957 | Dietzler et al. _____ 260—623 |
| 2,843,634 | 7/1958 | Prutton. |
| 3,014,079 | 12/1968 | Olin. |
| 1,938,911 | 12/1933 | Klarmann _____ 260—623 |

BERNARD HELFIN, Primary Examiner

W. B. LONE, Assistant Examiner